United States Patent

Butts

[11] Patent Number: 5,560,051
[45] Date of Patent: Oct. 1, 1996

[54] TOILET TRAINING DEVICE

[76] Inventor: Becky Butts, 125 McGaughey Dr., Mt. Zion, Ill. 62549

[21] Appl. No.: 383,436

[22] Filed: Feb. 3, 1995

[51] Int. Cl.[6] .................................................. A47K 11/04
[52] U.S. Cl. ...................... 4/479; 4/661; 4/902; 340/604
[58] Field of Search ........................... 4/300.3, 479, 483, 4/661, 314, 902; 340/604, 605; 174/11 R; 434/247; 128/886; 604/361

[56] References Cited

U.S. PATENT DOCUMENTS

| | | | |
|---|---|---|---|
| 2,535,704 | 12/1950 | Snyder et al. | 116/67 R |
| 3,020,528 | 2/1962 | Swanson, Jr. et al. | 4/483 |
| 4,162,490 | 7/1979 | Fu et al. | 340/603 |
| 4,297,686 | 10/1981 | Tom | 340/604 |
| 4,299,041 | 11/1981 | Wilson | 40/124.1 |
| 4,484,573 | 11/1984 | Yoo | 128/886 |
| 4,640,276 | 2/1987 | Jing-Sheng | 128/886 |
| 4,896,527 | 1/1990 | Akiba | 174/11 R X |
| 5,008,964 | 4/1991 | Dean et al. | 4/661 |
| 5,043,704 | 8/1991 | Blakeney | 340/573 |
| 5,266,928 | 11/1993 | Johnson | 340/604 |
| 5,341,127 | 8/1994 | Smith | 340/604 |
| 5,363,516 | 11/1994 | Butts | 4/661 |

*Primary Examiner*—Robert M. Fetsuga
*Attorney, Agent, or Firm*—Shlesinger, Arkwright & Garvey

[57] ABSTRACT

A sound-generating toilet training device for use with a conventional potty chair is provided comprising a self supporting base member having a generally planar top face and a bottom face, the base member is adapted to be removably received within a receptacle of the potty chair, an actuating member is positioned on the top face for actuating an electronic circuit, the actuating member including a pair of interleaved contact members insulated from each other, a generating member coupled to the actuating member is also provided for generating an output signal, the generating member being sealed against fluid contact and an emitting member, the emitting member is responsive to the output signal and emits an audible sound, the generating member and the emitting member are positioned on the base member whereby when the device is positioned within a potty chair receptacle and a child urinates thereon, the contact members are caused to be bridged by the urine enabling an output signal to be generated that is emitted as an audible sound for the enjoyment of the child.

4 Claims, 2 Drawing Sheets

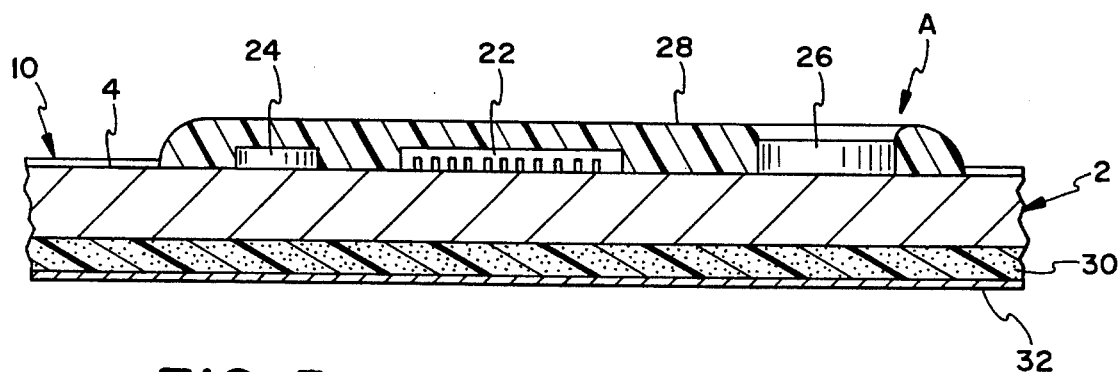
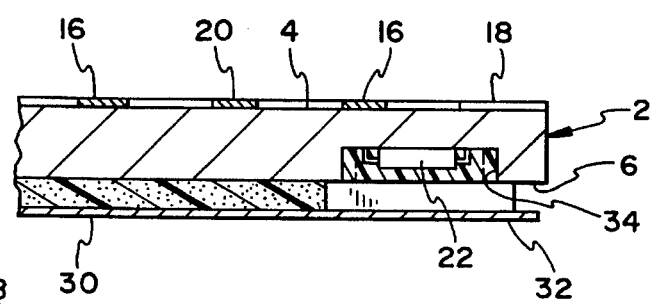
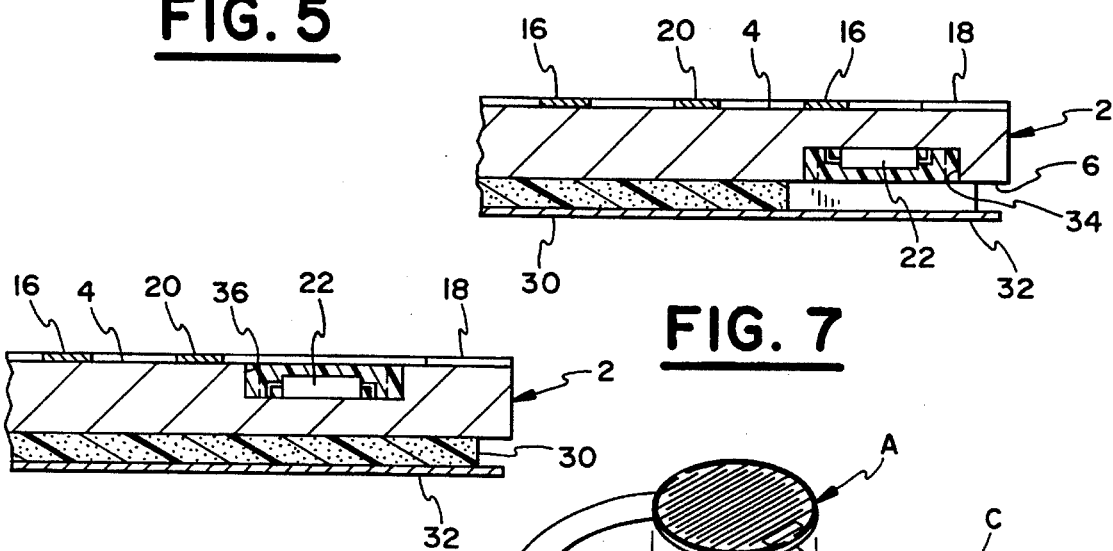
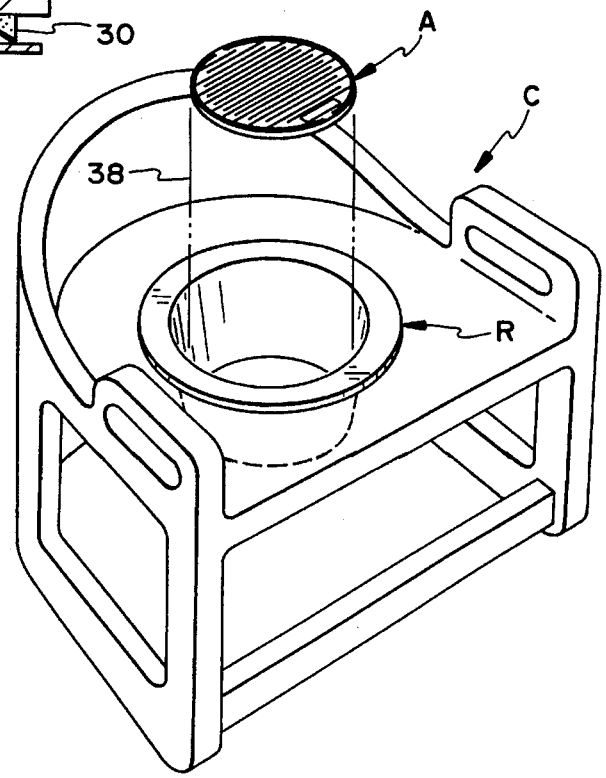

ing a base member that may be removably received within the receptacle of conventional potty chairs thereby facilitating cleaning the chair and increasing the useful life of the device.

TOILET TRAINING DEVICE

FIELD OF THE INVENTION

The present invention relates to training aids and more particularly to a toilet training device for instructing infants or other young children on how to properly use a toilet for urination.

BACKGROUND OF THE INVENTION

Conventional childhood development includes instruction of the child by the parent or guardian on use of a toilet. This phase of childhood development is commonly referred to a "toilet training" or "potty training" and during this time the child is encouraged to use a toilet rather than rely upon diapers or the like. Instruction on use of a toilet requires patience and perseverance on the part of the parent because children are highly individual on how they react to the training. It is therefore highly desirable to reduce the amount of time it takes to instruct small children on the proper use of a toilet.

In addition, a device that will make urination into the toilet enjoyable and interesting for the child is desirable. It is believed that attracting the child's attention to the toilet will encourage urination and therefore alleviate and/or avoid the stress normally associated during this period.

In view of the above, a variety of prior art devices have been developed to encourage children to use the toilet. For instance, visible targets are often placed within the toilet or affixed to the open face of the toilet. Other prior art devices comprise thin paper stock elements having indicia or other designs so that when placed on the surface of the toilet water will attract the child's attention. Still other devices comprise chairs adapted to emit music or sound upon successful use of the toilet. For example, U.S. Pat. No. 3,020,528 (Swanson Jr. et al.) discloses a potty chair having a receptacle portion provided with electrical contacts disposed in the bottom thereof and associated wiring and power means extending though the tubing and the chair. Urine collected within the receptacle causes a circuit to be completed thereby enabling a buzzer to sound, attracting the child's attention.

In a similar manner, U.S. Pat. No. 5,008,964 (Dean et al.) discloses a potty chair having conductive strips integral with the bottom of a receptacle and including associated circuitry enabling a voice message to be automatically played once the child relieves himself or herself into the device. Each of these prior art sound-generating devices are complicated and difficult to clean. More importantly, these devices cannot be retrofitted to a conventional potty chair. The circuitry and wiring of the prior art devices are incorporated within the chair itself thereby rendering the device cumbersome to clean and prone to failure.

A need has therefore existed within the art for a sound-generating toilet training device that attracts the attention of the child during use of the toilet and encourage further use in a proper manner while at the same time shortening the toilet training period and enabling a conventional potty chair to be rendered sound generating.

OBJECT AND SUMMARY OF THE INVENTION

The present invention is a sound-generating toilet training device for use with a conventional potty chair comprising a self supporting base member having a generally planar top face and a bottom face, the base member is adapted to be removably received within a receptacle of a potty chair, an actuating member is positioned on the top face for actuating an electronic circuit, the actuating member including a pair of interleaved contact members insulated from each other, a generating member coupled to the actuating member is also provided for generating an output signal, the generating member being sealed against fluid contact and an emitting member responsive to the output signal for emitting an audible sound, the generating member and the emitting member are positioned on the base member whereby when the device is positioned within a potty chair receptacle and a child urinates thereon, the contact members are caused to be bridged by the urine enabling an output signal to be generated and emitted as an audible sound.

The present invention also relates to a method for interesting a child in using a toilet for the elimination of urine comprising the steps of providing a toilet having a receptacle therein for the collection of urine, the receptacle having bottom, sides and an open top to allow access therein, providing a toilet training component including a self-supporting base member having a generally planar top face and a bottom face, the base member is adapted to be removably received within the toilet receptacle, an actuating member for actuating an electronic circuit, the actuating member being positioned on the top face and including a pair of interleaved contact members insulated from each other, a generating member for generating an output signal, the generating member being coupled to the actuating member and sealed against fluid contact and an emitting member for emitting an audible sound, the emitting member being responsive to the output signal, each of the generating member and the emitting member are positioned on the base member, positioning the component within the toilet receptacle and emitting an audible sound when a child urinates into the receptacle and the contact members are caused to be bridged by the urine to generate an output signal.

The present invention further relates to a sound generating toilet training device for use with a conventional potty chair comprising a self-supporting base member having a generally planar top face and a bottom face, the base member is adapted to be removably received within the potty chair receptacle and configured to lie substantially flush against the bottom of the receptacle, an actuating member for actuating an electronic circuit, the actuating member being positioned on the top face and including a pair of interleaved contact members insulated from each other and extending across a majority of the surface of the top face, a generating member for generating an output signal, the generating member including an intergraded circuit and a power supply coupled to the actuating member and sealed against fluid contact, and a speaker, the speaker being responsive to the output signal, the generating member and the speaker are positioned on the top face whereby when the device is placed within a potty chair receptacle and a child urinates thereon, the contact members are caused to be bridged by the urine, enabling the generation of an output signal emitted from the speaker as an audible sound.

It is therefore an object of the present invention to provide a toilet training device for children that encourages the child to use the toilet thereby alleviating the extreme difficulty associated with toilet training instruction.

An additional object of the present invention is to provide a toilet training device for children that will readily attract the attention of the child as he or she is urinating thereby reinforcing the child with positive thoughts during the training period.

Yet another object of the present invention is to provide an electronic, sound-generating toilet training device having simple construction and readily adapted for use with a conventional potty chair without the need for complicated wiring, power sources or retrofitting.

Yet a further object of the present invention is to provide a toilet training device that is readily cleaned of urine and is reusable.

Still a further object of the present invention is to provide a toilet training device readily adapted for use with the child's existing potty chair thereby eliminating the level of anxiety that a new, unfamiliar chair would bring.

A further object of the present invention is to provide a toilet training device for children that is economical to manufacture and assemble.

Yet another object of the present invention is to provide a hygienic toilet training device that is easily cleaned because of the relatively smooth, seamless, one-piece construction.

A still further object of the present invention is to provide a toilet training device having one-piece construction whereby all electrical components are confined to the unitary base member so that when placed within the receptacle of a potty chair, all electrical components are kept at a distance from the child and no contact is possible between the child and the electrical systems.

These and other objects of the present invention will become apparent from the detailed description below taken in conjunction with the drawings and the claims.

BRIEF DESCRIPTION OF THE DRAWINGS

FIG. 5 is an enlarged cross-sectional view with portions broken away of the device shown in FIG. 3 and taken along lines 5—5;

FIG. 6 is an alternative embodiment of the device shown in FIG. 4;

FIG. 7 is an alternative embodiment of the device shown in FIG. 4; and

FIG. 8 is an exploded, perspective view illustrating a conventional potty chair and the device according to the present invention including phantom lines indicating alignment of the device of the present invention for placement within the chair receptacle.

DETAILED DESCRIPTION OF THE PREFERRED EMBODIMENT

Figure 1:
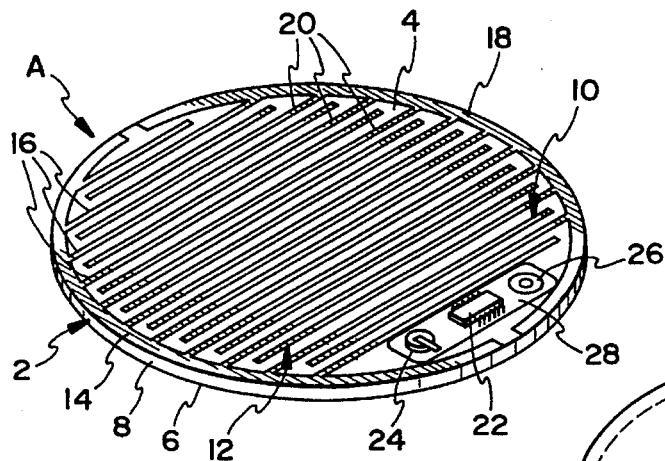
FIG. 1 is a perspective view of the toilet training device according to the present invention.
Figure 3:
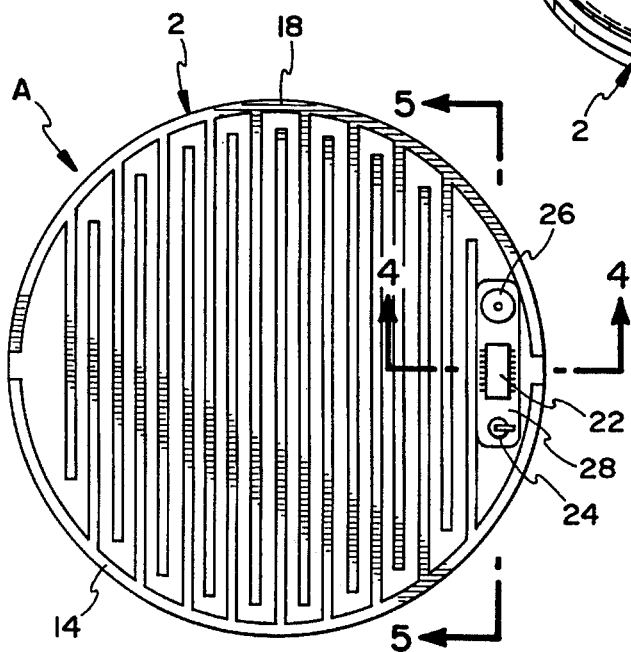
FIG. 3 is a top plan view of the device shown in FIG. 1.

Turning to FIGS. 1 and 3, the sound-generating toilet training device A according to the present invention is generally shown comprising a base member 2 having a top face 4, a bottom face 6 and a side portion 8.

In the preferred embodiment, the base member 2 is a conventional circuit card constructed from melamine or equivalent. The base member 2 preferably has a diameter of about 5 or 6 inches and a thickness of about 1/16 of an inch. As is readily apparent, the dimension of the base member 2 may be modified to accommodate the receptacle in which it is inserted without deviating from the scope of the present invention. For example, the diameter base member could be increased or configured as a square to enable the device to interfit within the receptacle portion of the child's potty chair.

A pair of separate conductor member 10 and 12 are disposed on top face 4 as shown. Conductor member 10 includes a perimeter portion 14 extending approximately half way along the edge of top face 4. A plurality of secondary portions 16 extend from the perimeter portion 14 across the top face 4. In a similar manner, conductor member 12 includes a perimeter portion 18 with secondary portions 20. As can be seen in FIGS. 1 and 3, the respective secondary portions 16 and 18 are spaced apart a predetermination distance and alternate along the surface of top face 4. This configuration will enable a relatively small amount of urine to close the gap between the separate conductor members 10 and 12 closing a circuit described in greater detail below. Other configurations are within the scope of the present invention so long as they enable a circuit to become closed upon contact with fluid. Conductor members 10 and 12 may be constructed from conventional copper material circuit runs and adhered to the surface of the base member via conventional photo-etching processing or the like as is known in the art.

Figure 2:
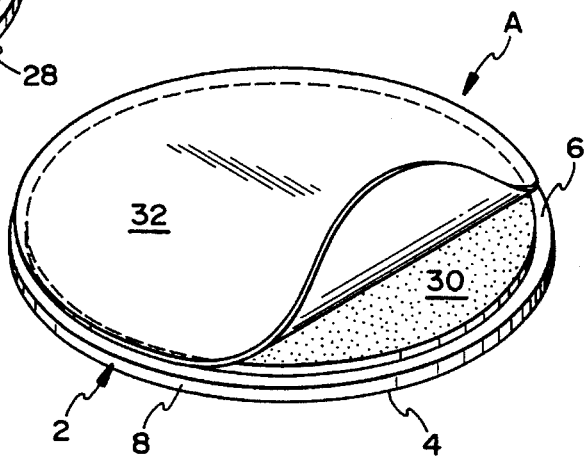
FIG. 2 is a perspective view of the underside of the device in FIG. 1 and illustrating a partially exposed foam adhesive layer.

Turning now to FIG. 2, the underside or bottom face 6 is shown and includes backing material such as, for example, an adhesive coated sponge material 30. The adhesive sponge material 30 is waterproof and may include a removable cover 32 that is removed prior to use to secure the device within a potty chair receptacle.

A computer chip 22, is positioned along the edge of the base member 2 at one end thereof. Chip 22 provides voice or sound recordation and has playback capabilities. Such computer chips are known as complimentary metal oxide semi-conductor (CMOS) devices and provide within a single unit an on-chip oscillator, microphone pre-amplifier automatic gain control, anti-biasing filter, smoothing filter and speaker amplifier. The selected recordings are stored in non-volatile memory cells to provide zero-power message storage. The voice and/or audio signals are stored directly in natural analog form within the memory. A single power source 24 is provided, for example a six volt lithium battery cell or equivalent. In addition, chip 22 is connected to a speaker 26. In the preferred embodiment, the speaker 26 will be a piezoceramic speaker capable of flush mounting to the base and having a 900 Hz resonant frequency. Depending upon the selection of the computer chip 22, power source 24 and speaker 26, capacitors and/or resistors may also be provided (not shown).

A preferred computer chip within the scope of the present invention is model IST 1420 available from Information Storage Devices of San Jose, Calif. A preferred speaker is the model KPS-100 piezospeaker available from Projects Unlimited, Inc. of Dayton, Ohio. As is readily apparent, other equivalent devices are within the scope of the present invention so long as they provide voice and/or sound record/playback capabilities.

Figure 4:
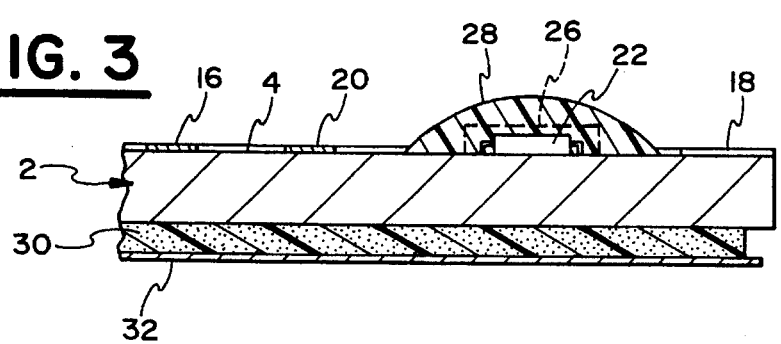
FIG. 4 is an enlarged cross-sectional view with portions broken away of the device shown in FIG. 3 and taken along lines 4—4.

As best shown in FIGS. 4 and 5 the computer chip 22 and power source 24 are covered with a waterproof coating 28. In a preferred embodiment, the coating 28 is an epoxy resin, however other resinous and non-resinous coatings are within the scope of the present invention so long as they provide protection of the power source 24 and computer chip 22 from exposure to moisture and especially urine. Speaker 26 is surrounded but not covered with coating 28.

Turning to FIGS. 1 and 3, the computer chip 22, power source 24 and speaker 26 are positioned adjacent each other at one end of the base member 2 and between the conductor members 10 and 12. The conductor members 10 and 12 are connected to the computer chip 22. Because the computer chip 22, power source 24 and speaker 26 are positioned at one side of the top face 4 of base member 2, a major portion of the top face 4 is exposed and readily available for contact with the urine.

An alternative embodiment of the present invention is shown in FIG. 7 whereby the computer chip 22, power source 24 and speaker 26 are recessed within the bottom face 6 of base member 2. Recessed portion 34 houses the computer chip 22 as well as the power source (not shown) and speaker (not shown). A still further embodiment is shown in FIG. 6 whereby a recessed portion 36 within top face 4 receives the computer chip 22, power source (not shown) and speaker (not shown). In each of these embodiments, the waterproof coating 28 encapsulates the computer chip 22 and power source (not shown) as required in the previous embodiments of FIGS. 4 and 5.

Turning now to FIG. 8, the toilet training device A according to the present invention is shown aligned with a conventional potty chair C for positioning within the chair receptacle R. As indicated by phantom lines 38, the toilet training device A is placed within receptacle R so that the top face 4 containing the conductor members 10 and 12 face upwardly and bottom face 6 is supported by the bottom of receptacle R. As is readily apparent, the cover 32 on backing material 30 will be removed so that device A can be adhesively secured to the receptacle R bottom.

Once positioned within the receptacle R the device A is ready for use. A child is allowed to relieve himself into the receptacle in the usual manner. The circuit within the computer chip 22 will then be activated by the urine deposited into the receptacle R which bridges the gap between adjacent conductor members 10 and 12 causing a very small amount of electric current from the power source 24 to trigger the playback mode of the chip, generating a signal emitted as sound through speaker 26. The sound may be either a musical tune or a voice speaking to the child in a congratulatory manner or familiar animal sounds or the like. The child, upon hearing the sound, is pleasantly surprised and therefore encouraged to use the device in the future thereby associating positive thoughts with the chair.

After use, the receptacle R is conveniently lifted out of the chair C so that collected urine can be disposed of in a known manner. Once the urine is removed, the moisture which had previously bridged the gap between the conductor members 10 and 12 is absent and the circuit returns to the "open" position. If desired, computer chip 22 can be designed to either continuously emit a musical tune until the urine is removed or emit a timed musical tune that ends after a predetermined period.

While this invention has been described as having a preferred designs, it is understood that it is capable of further modifications, users and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

I claim:

1. A method for interesting a child in using a toilet comprising the steps of:

a) placing a toilet training component within a toilet receptacle, the receptacle having a bottom, sides, and open top allowing access therein, the toilet training component comprising a self-supporting base member having a top face and a bottom face, the base member adapted to be removably received within the toilet receptacle, means for generating an output signal, means for actuating the generating means, the actuating means positioned on the top face and including a pair of interleaved contact members insulated from each other, the generating means being coupled to the actuating means and sealed against fluid contact, means for emitting an audible sound, the emitting means is responsive to the output signal generated by said generating means and each of the generating means and the emitting means being positioned on the base member;

b) having a child urinate into the receptacle and onto the top face of the toilet training component thereby causing the contact members to be bridged and the output signal to be generated; and c) emitting an audible sound upon generation of the output signal whereby the child is caused to be interested in using the toilet.

2. The method as set forth in claim 1 and further including the step of:

a) securing the component to the toilet receptacle with adhesive.

3. The method as set forth in claim 1 and wherein: a) the generating means includes a computer chip and a power supply.

4. The method as set forth in claim 1 and where in:

a) the emitting means is a speaker.

\* \* \* \* \*